(12) United States Patent　　(10) Patent No.: US 8,375,012 B1
Graefe　　(45) Date of Patent: Feb. 12, 2013

(54) COMPUTER INDEXES WITH MULTIPLE REPRESENTATIONS

(75) Inventor: Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/206,759

(22) Filed: Aug. 10, 2011

(51) Int. Cl.
　　*G06F 17/30*　　(2006.01)
(52) U.S. Cl. ....................................................... 707/696
(58) Field of Classification Search .................. 707/696, 707/711, 741, 744
　　See application file for complete search history.

(56) References Cited

U.S. PATENT DOCUMENTS

| | | | |
|---|---|---|---|
| 5,204,958 A | | 4/1993 | Cheng et al. |
| 5,276,872 A | | 1/1994 | Lomet et al. |
| 5,752,243 A | * | 5/1998 | Reiter et al. ........................ 1/1 |
| 5,806,065 A | | 9/1998 | Lomet |
| 5,920,857 A | | 7/1999 | Rishe et al. |
| 6,792,432 B1 | | 9/2004 | Kodavalla et al. |
| 6,847,958 B2 | * | 1/2005 | Woo ..................................... 1/1 |
| 7,558,802 B2 | * | 7/2009 | Yako et al. .......................... 1/1 |
| 7,636,882 B2 | * | 12/2009 | Aureglia et al. ............ 715/227 |
| 7,685,109 B1 | * | 3/2010 | Ransil et al. ........... 707/999.003 |
| 7,702,640 B1 | * | 4/2010 | Vermeulen et al. ........ 707/999.1 |
| 7,941,413 B2 | * | 5/2011 | Kashiyama et al. .......... 707/696 |
| 2002/0040361 A1 | * | 4/2002 | Tikkanen et al. ................ 707/3 |
| 2006/0036802 A1 | * | 2/2006 | Drukin .......................... 711/103 |
| 2008/0065670 A1 | | 3/2008 | Cha et al. |
| 2008/0301646 A1 | * | 12/2008 | Gupta .......................... 717/127 |
| 2009/0012976 A1 | * | 1/2009 | Kang et al. .................... 707/100 |
| 2010/0010967 A1 | * | 1/2010 | Muller ............................. 707/3 |
| 2010/0131700 A1 | * | 5/2010 | Castillo ........................ 711/103 |
| 2010/0217953 A1 | | 8/2010 | Beaman et al. |

OTHER PUBLICATIONS

Lu, Hongjun et al., "T-Tree or B-Tree: main Memory Database Index Structure Revisited", Published 2000, pp. 65-73.

* cited by examiner

*Primary Examiner* — Cam-Linh Nguyen

(57) ABSTRACT

The present application is directed to an indexing system. In one example, the indexing system includes one or more processors, one or more electronic memories that provide random access memory, one or more mass storage devices that provide persistent data storage, and one or more indexing routines, executed by the one or more processors, that create and manage an index data structure comprising nodes that include key-values/reference pairs, the index data structure additionally including a sibling reference for each index-data-structure node stored in the one or more electronic memories, the one or more indexing routines removing, from the index data structure, the sibling references for index-data-structure nodes when transferring the index-data-structure nodes from the one or more electronic memories to the one or more mass storage devices.

20 Claims, 8 Drawing Sheets

COMPUTER INDEXES WITH MULTIPLE REPRESENTATIONS

TECHNICAL FIELD

The present application is directed to indexing systems that employ tree-like data structures and, as one example, to an electronic computing system that instantiates the tree-like data structures with sibling pointers in electronic memory while persistently storing the data structures, in non-volatile memory, without sibling pointers.

BACKGROUND

A variety of different types of indexing methods have been used in computational methods and systems for many years. Indexing systems are employed for efficient accessing of data stored within databases and database management systems, for storing information that represents the structure of hierarchical file systems, for storing page tables and other information used to implement virtual-memory systems, for implementing keyword search in internet search engines, for key-value stores, and for many other applications and uses. Indexing systems often employ collections of key-value/reference pairs. The key-value portion of the key-value/reference pair is an attribute value associated with a particular quantity of stored data and the reference, generally a memory pointer, a disk-block and/or disk-sector addresses, or another type of address or pointer, indicates where the particular quantity of stored data can be found in memory or within a mass-storage device. The key-value/reference pairs are compactly encoded in memory for rapid and efficient searching. The key-value/reference pairs are often stored within a data structure that provides for efficient access, entry, deletion, and updates to the key-value/reference pairs as well as for efficient searching based on key values. Various types of tree-like data structures, including AVL trees, various types of B trees, including B-link trees, B+ trees, B* trees, and other types of tree-structured data structures are widely used for indices within many types of computer systems, database management systems, storage devices, and other electronic devices and systems. Although B trees and B-tree variants have been known since the 1970's, research and development efforts continue to explore new types of B trees and B-tree-based electronic systems as well as other related data-structure-based systems that provide near-optimal or optimal efficiency with respect to index operations in particular applications and within particular computing systems.

DETAILED DESCRIPTION

Figure 1:
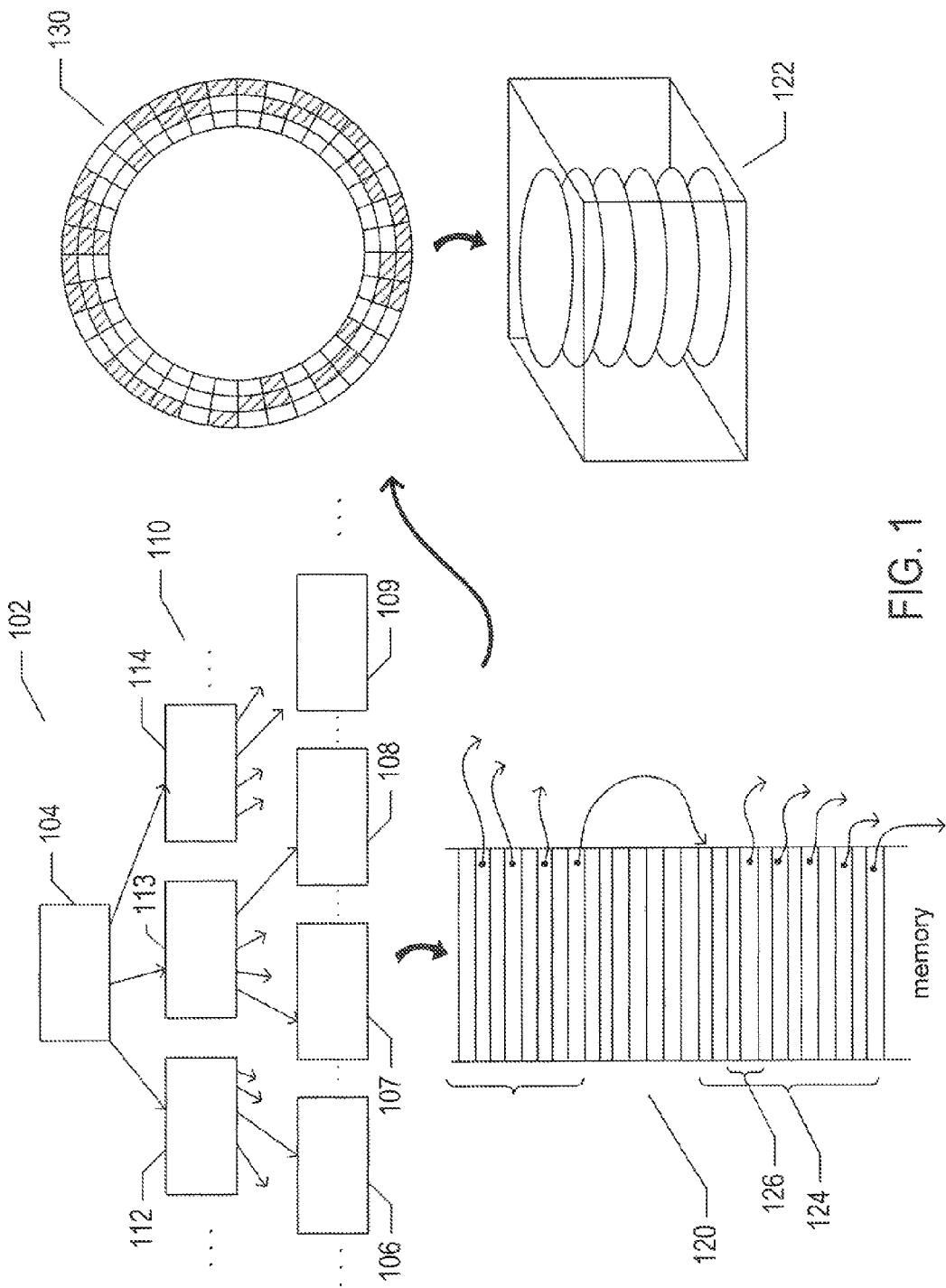
FIG. 1 illustrates components of a generalized electronic indexing subsystem of a computer system or other electronic system or device.

FIG. 1 illustrates components of a generalized electronic indexing subsystem of a computer system or other electronic system or device. An index is logically represented, in the generalized system illustrated in FIG. 1, as a tree-like data structure 102. The index includes a root node 104 and a generally large number of leaf nodes 106-109, and generally contains additional hierarchical levels of intermediate nodes, such as level 110 in FIG. 1 that includes intermediate nodes 112-114. In the representation 102 shown in FIG. 1, not all of the nodes are illustrated, for sake of compactness of illustration. In general, the leaf nodes contain either references to data or may themselves represent data blocks. The tree-like data structure is traversed, from root node 104 to a particular leaf node, by following a path of references from the root node down through the tree-like data structure to a particular leaf node. As is discussed further, below, the nodes of the data structure, represented as rectangles in FIG. 1, generally contain a list of key-value/reference pairs. Often, each node is encoded in a number of bytes equal to a memory page, mass-storage-device block, or other unit of data storage and data transfer within a computer system. Alternatively, the nodes can be encoded in a number of bytes equal to a simple fraction of the bytes of a memory page, mass-storage block, or other data-storage unit, or may be encoded in a number of bytes equal to some integer-number of memory pages, mass-storage-device blocks, or other data units.

While the index data structure is logically represented as a tree 102 for explanation and illustration, the index data structure is generally stored in a linear address space within electronic memory 120 and in one or more mass-storage devices 122 within the computer system or other electronic system. Often, the tree-like data structure is quite large, and only a portion of the tree-like data structure is stored within memory at any particular time. In general, the most recently accessed nodes of the data structure are found in electronic memory and various memory caches while the entire data structure is stored within the mass-storage device 122. In memory, the nodes are generally encoded within a linear memory address space as a number of consecutive words or other memory units. In FIG. 1, one node of a data structure is stored within a region of consecutive memory units 124 which includes a sub-region storing a list of key-value/reference pairs, such as key-value/reference pair 126. The mass-storage device or devices generally include a sequence of blocks or sectors within a linear block or sector address space 130 that is mapped to sectors, tracks, and cylinders of one or more mass-storage devices 122. Index-associated routines are responsible for moving data-structure nodes from the one or more mass-storage devices to memory and from memory back to the one or more mass-storage devices, generally on demand from routines that implement various index operations, including insertion, deletion, and searching operations.

Figure 2:
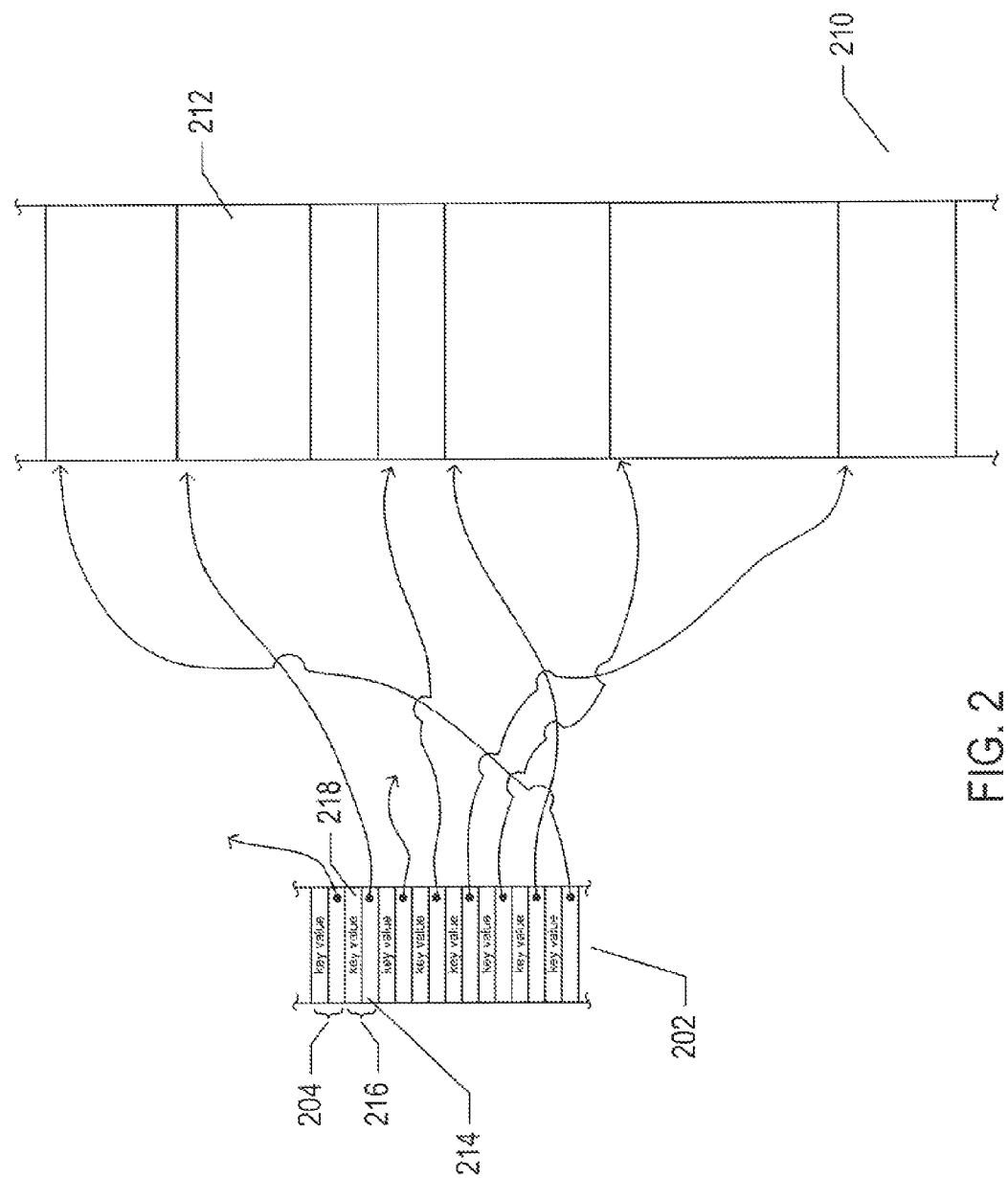
FIG. 2 illustrates use of an electronic index for indexing stored data.

FIG. 2 illustrates use of an electronic index for indexing stored data. In FIG. 2, a simple index 202 includes a list of key-value/reference pairs, such as key-value/reference pair 204. Generally, the key-value/reference pairs are organized in key-value order, so that a particular key value can be quickly located by searching the index for the key value. Each key value succinctly represents a generally larger amount of stored data. For example, key values may be Social-Security numbers or employee-identifier numbers that uniquely identify employees or clients stored within a database, with each employee or client represented by many different data fields. Continuing with this example, in FIG. 2, a number of client records are shown located within a logical address space representing data stored in a database management system, disk files, or in other such data-storage systems 210. The stored data 212 representing a particular client is referenced from the pointer 214 within key-value/reference pair 216 of the index 202, with the key value 218 identifying the client represented by the data record 212. Please note that, in the following discussion, the terms "pointer" and "reference" are used equivalently to indicate a value that refers to the location of a stored node or other stored object. Pointers may be virtual-memory addresses at which the referenced object is stored in memory, may be a combination of an identifier for a mass-storage device or system along with the address of a data-storage unit within the mass-storage device, and may be additional types of references, such as uniform resource locator ("URL").

There are many different types of key values, references, indexes, and stored data. For example, in certain cases, key values may be unique, while in other cases, key values stored in an index are not unique, but are instead used to find groups of stored data records or other stored data logically corresponding to the key value.

Indexes are employed for a variety of different reasons. Because the indexes can be stored far more compactly in memory than the cumulative stored data that they reference, multiple indexes can be used to represent different orderings of the stored data to allow stored data to be searched and accessed using different types of key values. Indexes may be used for efficiently sorting stored data as well as efficiently representing subsets of the stored data. In the example discussed in FIG. 2, a database management system may include a Social-Security-number index, a telephone-number index, a last-name index, and various other indexes that all reference data records in a common database, file, relational database table, or other type of data-storage area. The multiple indexes allow for efficient searching of the data records for one or more data records containing a particular Social Security number, telephone number, last name, or other key value.

Indexes may be stored in memory and in mass-storage in many different ways. Although tree-like indexes are often illustrated as having pointers, stored in nodes, pointing to child and sibling nodes, the pointers may be stored in node descriptors and may reference other node descriptors, rather than directly referencing nodes.

Figure 3:
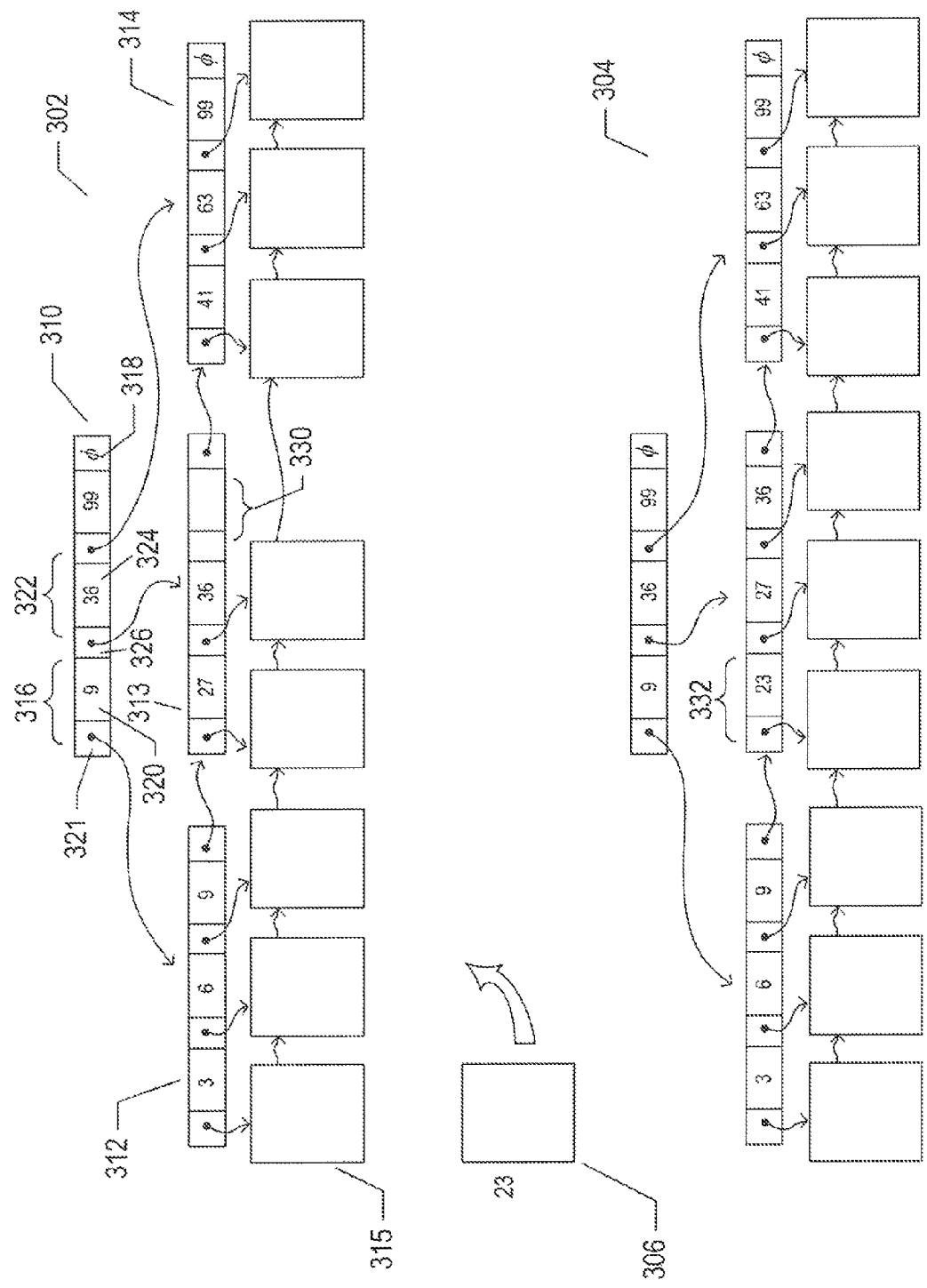
FIGS. 3-5 illustrate one B-tree variant referred to as a B-link tree.
Figure 4:
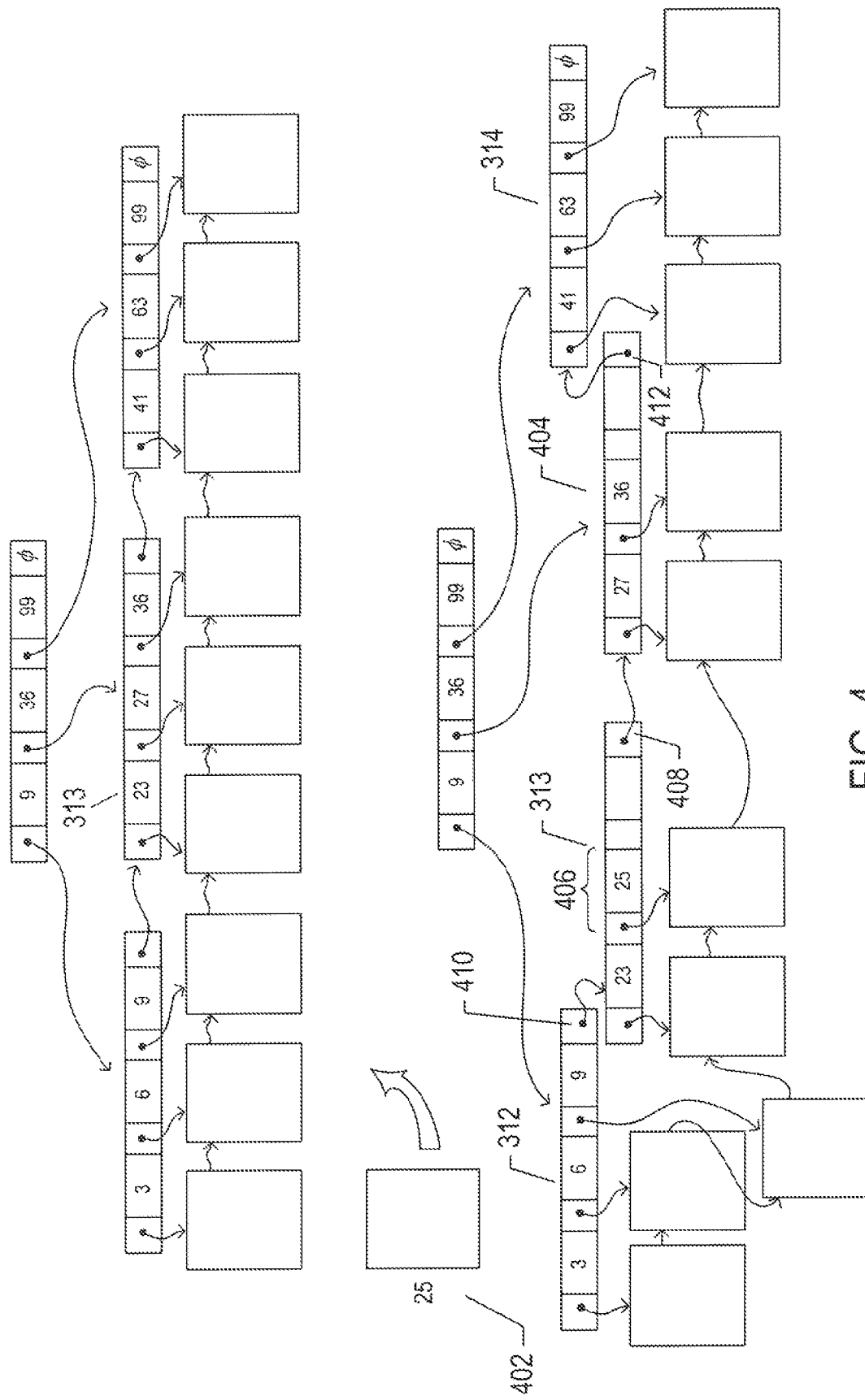
Figure 5:
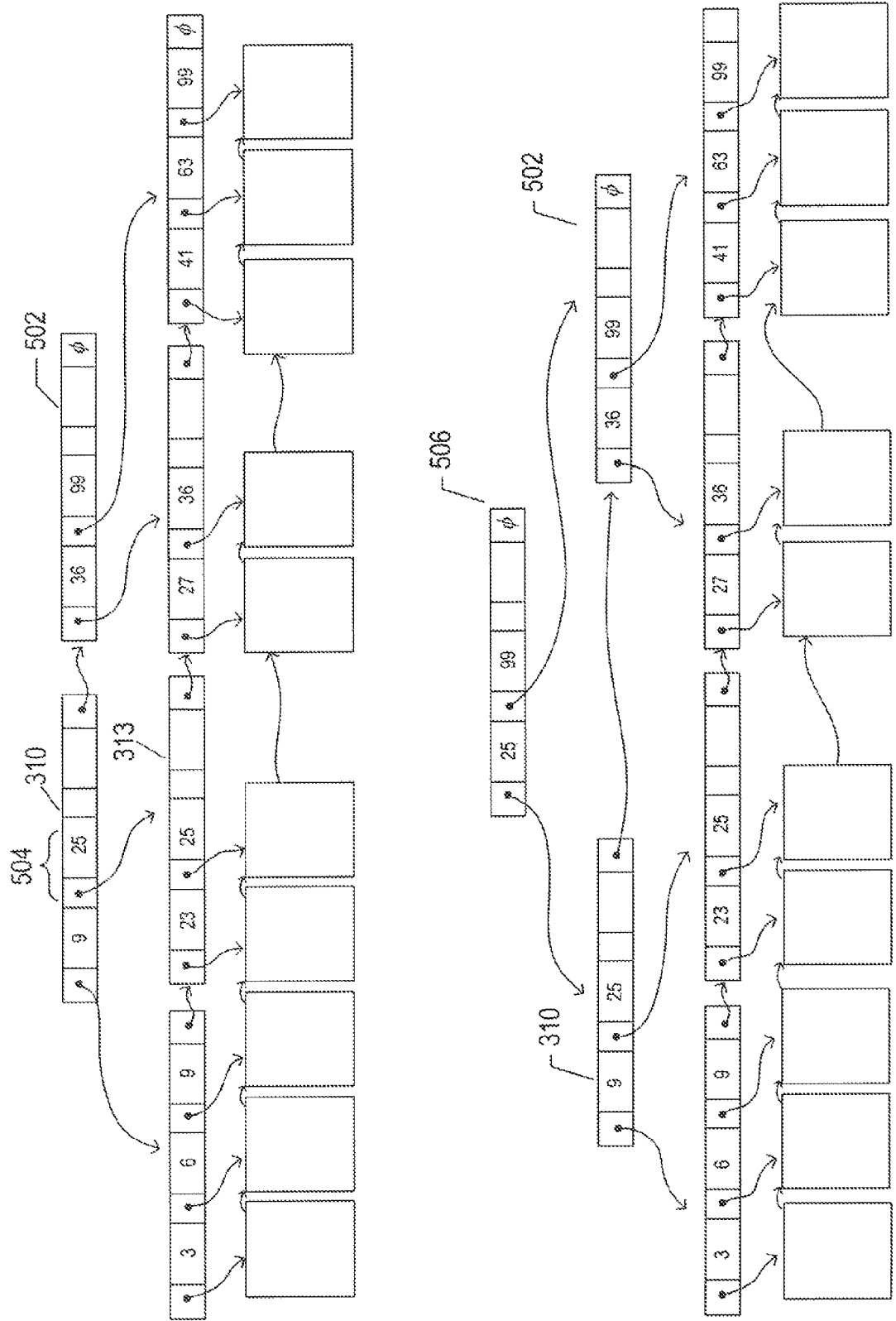

FIGS. 3-5 illustrate one B-tree variant referred to as a B-link tree. All of FIGS. 3-5 use the same illustration conventions, next described with reference to FIG. 3. FIG. 3 shows a small, example B-link tree before 302 and after 304 addition of a new key value and associated data 306. The initial B-link tree 302 is shown to include a root node 310, three lower-level nodes 312-314, and a large number of leaf nodes, such as leaf node 315 This B-link tree features nodes that include up to three key-value/reference pairs, such as key-value/reference pair 316, as well as a final sibling pointer 318. For the root node 310 and rightmost lower-level node 314, the sibling pointer 318 is null. Sibling pointers may also be referred to as "sibling references."

As mentioned above, a new key value "23" and corresponding data record 306 need to be inserted into the B-link tree 310. In order to find an appropriate place to insert the new key value and data record, an insertion routine starts at the root node 310 and traverses the B-link tree. Within the root node, key values in the key-value/reference pairs are stored in increasing numerical order. In the example B-link tree of FIGS. 3-6, the key values are simple integers. In order to find a slot for the new key value "23," each key value stored in the node is examined, from left to right, in order to find the key value that is greater than the key value to be entered. First, key value "9" 320 is considered. Because 23 is greater than 9, and because key value "9" 320 in the root node indicates that the lower-level node referenced by pointer 321 includes key values that are less than or equal to 9, the newly entered key value "23" cannot be stored in the node referenced by pointer 321 or in any ancestor of that node. Therefore, the next key-value/reference pair 322 in the root node is considered. The key value "36" 324 in this key-value/reference pair is greater than the value of the key to be inserted, 23, and therefore the node pointed to by reference 326 in key-value/reference pair 322, or an ancestor of that node, can contain the new key value. Thus, the routine follows pointer 326 to node 313, where the routine continues to search for a slot to insert key value "23" in similar fashion. Clearly, the routine for searching for a slot to insert a new key value can be implemented as a recursive routine that calls itself to continue the search at each new node in a traversal path. Because B-link tree 302 includes a root node and three lower-level nodes, because lower-level node 313 has been reached as the terminal node of a traversal path, and because lower-level node 313 includes an open slot 330, the key-value/reference pairs within node 313 can be reorganized to incorporate the new key value and reference to associated data as key value/reference pair 332 in the B-link tree 304. Note that, in FIG. 3, the lower-level nodes of the B-link tree reference leaf nodes while the root node references intermediate-level nodes.

FIGS. 4 and 5 illustrate addition of another new key value and associated data record to the B-link tree shown at the bottom of FIG. 3. The new key value "25" and associated data record 402 end up needing to be inserted, by the insertion-point-finding method discussed with reference to FIG. 3, into node 313. However, lower-level node 313 is already full, containing key values "23," "27," and "36." In order to accommodate this new entry, node 313 is split into a pair of nodes that include node 313 and a newly allocated node 404, as shown in the lower portion of FIG. 4. Half of the key-value/reference pairs are moved from node 313 into newly allocated node 404. Then, a new key value "25" and pointer to the associated leaf node is inserted into node 313 as key-value/reference pair 406.

Note that, during the node-splitting operation shown in the lower portion of FIG. 4, the split node 313 and newly allocated node 404 are linked together by the sibling pointer 408 from node 313 to node 404. In addition, the sibling pointer 410 of node 312 is linked to node 313, as before, and the sibling pointer 412 of newly allocated node 404 is linked to node 314. All of the nodes at any particular level within the B-link tree are thus linked together by sibling pointers. It turns out that this property of B-link trees allows the B-link trees to be very efficiently accessed by concurrent accessing routines, processes, or threads. When the node-splitting and sibling-pointer-based horizontal linking is carried out appropriately, there is no intermediate state created during the splitting process that would frustrate or prevent another reader thread or process from correctly traversing the B-link tree to find a particular key value and associated data record, and thus node locking by readers can be avoided. Moreover, the sibling-pointer-based linking of all nodes at each level in the B-link tree allow for efficient concurrent WRITE access to B-link trees, with only very localized node locking needed to write values into nodes that, in the case shown in FIG. 4, may lead to node splitting.

Although key value "25" and its associated leaf node have been inserted into B-link tree as shown in the bottom portion of FIG. 4, the insertion operation is not complete. There is no key-value/reference pair in the root node that references node 313. Moreover, there are now four nodes that are direct ancestors of the root node, and, in the particular B-link tree illustrated in FIGS. 3-5, no node may have more than three direct ancestors. Therefore, as shown in FIG. 5, the splitting operation recursively proceeds upward at least one level. In the top portion of FIG. 5, the root node is split, the higher-valued keys move from the existing root node to a newly allocated node 502 at the same level as the root node 310, and a key-value/reference pair 504 has been inserted into root node 310 to reference node 313. However, a B-link tree can only have a single root-level node. Therefore, as shown in the lower portion of FIG. 5, a new root node 506 is allocated to reference nodes 310 and 502, which now become a first intermediate-level node within the B-link tree. Continued insertions generally lead to additional intermediate-level nodes within the B-link tree, with a greater number of nodes at each level, including the leaf level. Expressions can be formulated to describe the numbers of intermediate-level-node levels, intermediate nodes, and leaf nodes within a B-link tree following an arbitrary number of key-value/data-record insertions, usually within ranges since the exact numbers may vary with respect to then key values and insertion order of key values.

The B-link tree illustrated in FIGS. 3-5 employs left-to-right sibling pointers. Alternatively, B-link trees and other tree-like index data structures may employ right-to-left sibling pointers or both right-to-left and left-to-right sibling pointers. Tree-like data structures may also include parent pointers in addition to child pointers.

Unfortunately, there are certain inefficiencies associated with storing sibling pointers within B-link trees in mass-storage devices. When B-link trees are repeatedly accessed, the mapping of B-link trees to disk blocks or disk sectors can become inefficiently organized. At regular intervals, it is common for the B-link nodes stored on mass-storage devices to be rearranged in order to provide more efficient, subsequent access. Relatively complex schemes can be employed to attempt to take advantage of the logical geometry of mass-storage devices, including the sector, track, and cylinder geometries, in order to minimize inefficient READ/WRITE-head movement across disk platters, in the case of magnetic disks. Other types of mass-storage devices feature different access constraints for which a proper arrangement of stored B-tree nodes can lead to greater access efficiency. However, the references within B-link trees must be transformed from memory references, when the B-link tree or portions of the B-link tree are stored in memory, to disk-block addresses, when the B-link tree or portions of the B-link tree migrate to mass-storage devices. The presence of sibling pointers can significantly decrease the ability to organize disk blocks within mass-storage devices for near-optimal or optimal access efficiency and can add complexity to migration and rearrangement routines, in turn leading to time delays and computational inefficiency.

Figure 6:
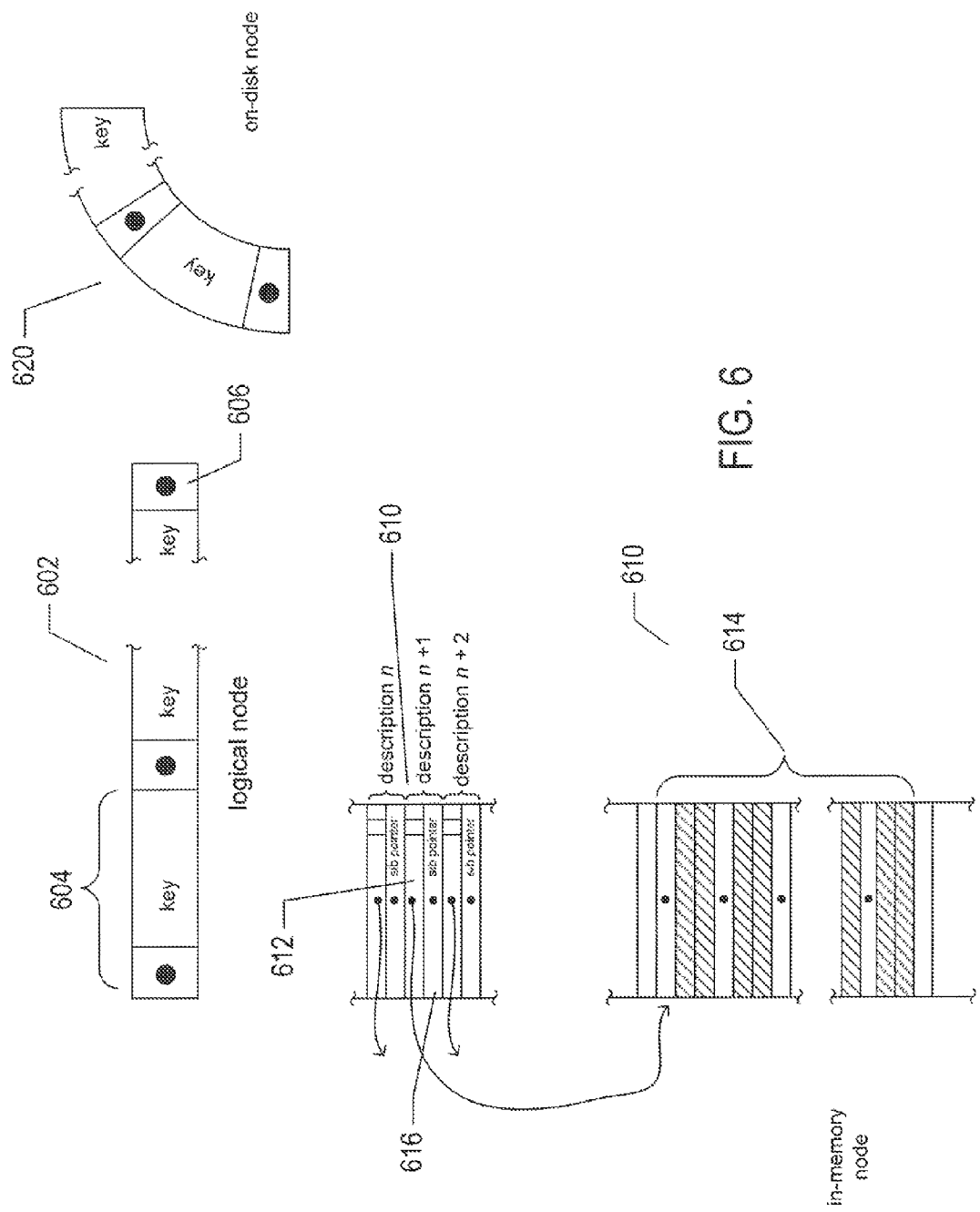
FIG. 6 illustrates one example directed to efficient organization of index data-structure nodes on mass-storage devices.

Present examples are directed to allowing for efficient organization of index data-structure nodes on mass-storage devices while, at the same time, providing the advantages of sibling pointers within in-memory data-structure nodes. FIG. 6 illustrates one example directed to efficient organization of index data-structure nodes on mass-storage devices. As with traditional B-link trees, the logical nodes 602 within the B-link trees include a list of key-value/reference pairs, such as key-value/reference pair 604, as well as a final sibling pointer 606. However, unlike in currently available indexing systems, the encoding of the data-structure logical node 602 in memory 610 places the sibling pointer for the node within a descriptor, stored in one place in memory, which references the in-memory encoding of the key-value/reference pairs of the node stored in a different location in memory. Alternatively, the sibling pointer may reference another descriptor. In certain examples, child and parent pointers may also reference descriptors. For example, in FIG. 6, node descriptor (or "description") n+1 within an ordered list of node descriptors includes a pointer 612 to the encoding of the key-value/reference pairs of the node in memory location 614 of memory 610 as well as the sibling pointer 616 for the node. In other words, the sibling pointer is stored within a node descriptor, rather than in the node itself, in the in-memory encoding of the node. When the node is moved to a mass-storage device, only the key-value/reference pairs, in memory location 614, are migrated to the mass-storage device. The descriptor and sibling pointer do not migrate to the mass-storage device. Thus the mass-storage-device encoding of the node includes the key-value/reference pairs 620 but no sibling pointer. The sibling pointers can be easily reconstructed for one, multiple, or all of nodes of a B-link tree within an in-memory, reconstructed B-link tree lacking sibling pointers following migration of nodes from a mass-storage device to memory. Encoding the B-link tree in memory, traversing the tree, and non-concurrent operations on the tree can be carried out without using sibling pointers. Instead, sibling pointers are primarily needed in order to allow for concurrent access to the in-memory encoding of the B-link tree or portions of the B-link tree encoded in memory.

Removal of the sibling pointers from a B-link tree results in a fully connected data structure that can be recursively traversed to reach each node in the data structure. It is possible to reassemble an intermediate tree data structure in memory from B-link-tree nodes stripped of sibling pointers retrieved from one or more mass-storage devices. Provided that the sibling pointers can be regenerated following migration of the sibling-pointer-stripped data-structure nodes back to memory, the methods and systems to which the current application are directed can be implemented by appropriately modifying current methods and systems. As mentioned above, a tree-like data structure may contain parent pointers in addition to child pointers as well as left-to-tight sibling pointers in addition to right-to-left sibling pointers. In these cases, the sibling pointers of both types as well as the parent pointers are stored in in-memory node descriptors but are not transferred to mass-storage when nodes are migrated from memory to mass-storage. Parent pointers and both types of sibling pointers can be reconstructed for an intermediate tree data structure that includes only child pointers to link the intermediate-tree-data-structure nodes together in a root-to-leaf, downward, acyclic fashion.

A simple C++ implementation of a sibling-pointer reconstruction routine is provided, below. Only those portions of the class declarations related to sibling-pointer reconstruction are provided and only a few relevant member-function implementations are subsequently provided, for the sake of brevity. First, an enumeration and several constants are defined:

enum NodeType {Node, Root, Intermediate, Leaf, Data};
const int d=2;
const int d2=d*2;
const int MAX_DEPTH=20;

The enumeration NodeType defines the different types of nodes within the B-link tree. For all but the root node, each node contains between a minimum of d key-value/reference pairs and at most d2 key-value/reference pairs. Implementation of B-link trees up to a number of levels equal to the constant MAX_DEPTH is provided for.

Next, a base node class, a "ptrKeyPair" class, each instance of which represents a key-value/reference pair, and the data node class are declared:

```
class node
{
  public:
    virtual NodeType getType( );
};
typedef node* nodePtr;
class ptrKeyPair
{
  private:
    int key;
    nodePtr ptr;
  public:
    int getKey( ) {return key;};
    void setKey(int k) {key = k;};
    nodePtr getPtr( ) {return ptr;};
    void setPtr(nodePtr p) {ptr = p;};
};
typedef ptrKeyPair* pairPtr;
class dataNode : public node
{
  private:
    int* data;
  public:
    dataNode(int* dt);
    NodeType getType( );
    int* getData( ) {return data;};
};
typedef dataNode* dataNodePtr;
```

Next, the class "treeNode" is declared:

class treeNode;

typedef treeNode* treeNodePtr;

class treeNode;

typedef treeNode* treeNodePtr;

class treeNode: public node

```
{
  private:
    ptrKeyPair pkPairs[d2];
    int num;
    treeNodePtr sibling;
    NodeType tp;
    int scanPt;
  public:
    treeNode(NodeType nt);
    NodeType getType( );
    bool getFull( ) {return (num == d2);};
    void setType(NodeType nt) {tp = nt;};
    void setSibling(treeNodePtr p) {sibling = p;};
    treeNodePtr getFirstPtr( );
    treeNodePtr getNextPtr( );
};
```

Instances of the "treeNode" class represent the root, intermediate, and leaf nodes of a B-link tree. Each node includes an array of instances of the "pkPairs" class that each stores a key-value/reference pair included in the node, and the data member num indicates the number of key-value/reference pairs currently stored in the node. Each instance of the class "treeNode" also includes a sibling pointer sibling, the type of node tp, and an integer scanPt that marks the location of a next key-value/reference pair to return in response to a call to the member function "getNextPtr." The member functions of the class "treeNode" include functions for getting the values of, and setting the values of, certain of the tree node data members as well as the pair of member functions "getFirstPtr" and "getNextPtr." These two functions allow a caller to get the first reference stored in the tree node and then to get each subsequent reference stored in the tree node.

Finally, declaration for the class "bTree" is provided:

```
class bTree
{
  private:
    treeNodePtr root;
    treeNodePtr lhand[MAX_DEPTH];
    void linkSibs(treeNodePtr nxt, int lvl);
  public:
    bTree( );
    void insert (int key, int* data);
    void linkSibs( );
};
```

Each instance of the class "bTree" includes a pointer to the current root tree node root and an array of tree node pointers lhand having a length equal to the maximum possible depth of a bTree. The public function member "linkSibs" and the private function member "linkSibs" together implement reconstruction of all of the sibling pointers within a bTree.

Straightforward implementations of the class treeNode function members used in the class bTree linkSibs implementation are next provided:

```
NodeType treeNode::getType( )
{
  return tp;
}
treeNodePtr treeNode::getFirstPtr( )
{
  scanPt = 1;
  return (treeNodePtr) pkPairs[0].getPtr( );
}
treeNodePtr treeNode::getNextPtr( )
{
  if (scanPt > num – 1) return 0;
  else return (treeNodePtr) pkPairs[scanPt++].getPtr( );
}
```

Finally, implementation of the public and private linkSibs member functions for the class bTree, which construct the sibling pointers for an intermediate B-link-tree-like data structure lacking sibling pointers, is provided:

```
void bTree::linkSibs(treeNodePtr nxt, int lvl)
{
  if (nxt->getType( ) != Leaf)
  {
    treeNodePtr p;
    linkSibs(nxt->getFirstPtr( ), lvl + 1);
    p = nxt->getNextPtr( );
    while (p != 0)
    {
      linkSisbs(p, lvl + 1);
      p = nxt->getNextPtr( );
    }
  }
  if (lhand[lvl] != 0) lhand[lvl]->setSibling(nxt);
  lhand[lvl] = nxt;
}
```

In the public function member linkSibs, which takes no arguments, the data-member array lhand is initialized to contain null pointers, and the cursive private function member linkSibs is called with the root node and level 0 supplied as arguments.

The private function member linkSibs is a recursive routine that carries out a depth-first, left-to-right traversal of the nodes of an instance of the class bTree. During the traversal, the argument lvl is incremented with each recursive call to represent the current level of the tree traversal. When the current invocation of the private function member linkSibs receives an argument nxt that references a non-leaf node of the tree, as determined in the first if statement of the routine, linkSibs is recursively called for each reference in the node referenced by argument nxt. Then, in the second-to-last line of the routine, when the entry in the lhand array corresponding to the current level of the traversal is not null, the sibling pointer of the tree node referenced by the lhand entry is set to argument nxt. Finally, in the last line of the private function member linkSibs, the argument nxt is placed into the entry of the lhand array responding to the current level of the traversal.

Figure 7A:
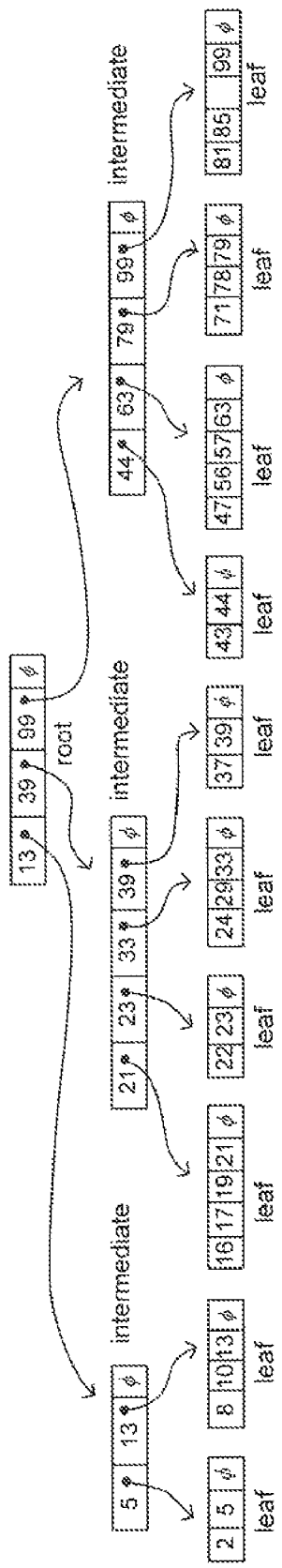
FIGS. 7A-B illustrate the sibling-pointer reconstruction process carried out by the function member "linkSibs."
Figure 7B:
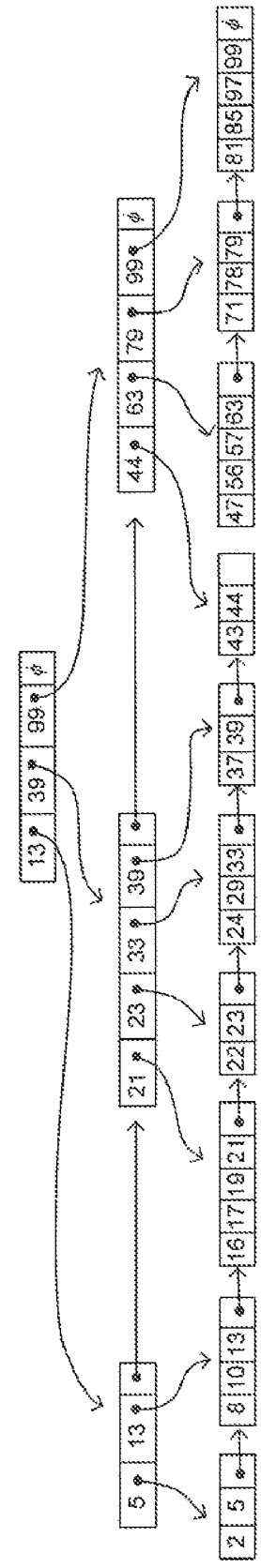

FIGS. 7A-B illustrate the sibling-pointer reconstruction process carried out by the function member "linkSibs." FIG. 7A represents the B-link tree created by inserting the following sequence of key values into an initially empty tree: 5, 10, 2, 99, 47, 13, 63, 78, 39, 33, 79, 21, 22, 23, 19, 8, 37, 44, 43, 81, 97, 85, 71, 16, 29, 57, 56, 24, 17. A subsequent call to the public function member linkSibs of the instance of class bTree then generates all of the needed sibling pointers, as shown in FIG. 7B.

Figure 8:
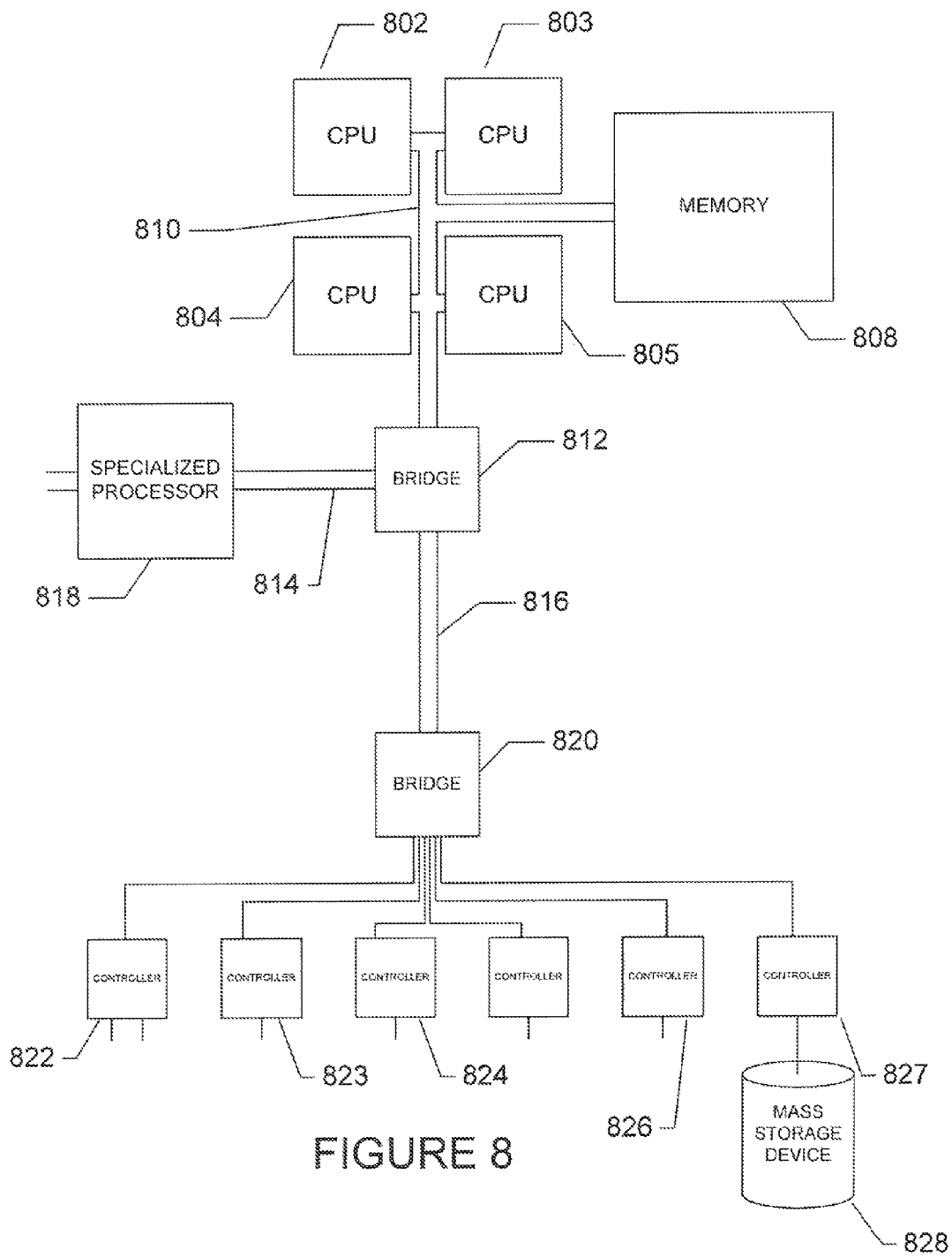
FIG. 8 illustrates a generalized computer architecture for a computer system that, when controlled by indexing routines, represents an example embodiment.

FIG. 8 illustrates a generalized computer architecture for a computer system that, when controlled by indexing routines, represents an example embodiment. The computer system contains one or multiple central processing units ("CPUs") 802-805, one or more electronic memories 808 interconnected with the CPUs by a CPU/memory-subsystem bus 810 or multiple busses, a first bridge 812 that interconnects the CPU/memory-subsystem bus 810 with additional busses 814 and 816, or other types of high-speed interconnection media, including multiple, high-speed serial interconnects. These busses or serial interconnections, in turn, connect the CPUs and memory with specialized processors, such as a graphics processor 818, and with one or more additional bridges 820, which are interconnected with high-speed serial links or with multiple controllers 822-827, such as controller 827, that provide access to various different types of mass-storage devices 828, electronic displays, input devices, and other such components, subcomponents, and computational resources. Examples of the present system and methods may also be implemented on distributed computer systems and can also be implemented partially in hardware logic circuitry.

Although the disclosed methods and systems have been described in terms of particular embodiments, it is not intended that the disclosed methods and systems be limited to these embodiments. Modifications will be apparent to those skilled in the art. For example, the efficient data-structure-based system and methods that represent present embodiments can be implemented in hardware circuitry, firmware, and/or software, and the implementation can vary in a variation of any of many different implementation and design parameters, including programming languages, data structures, modular organization control structures, and other such design and implementation parameters. The storing of various types of data structures which feature unneeded-for-mass-storage links and references according to present embodiments only in memory, and not in mass-storage devices, can be used for a variety of different types of data structures, including B-link trees, B+ trees, and many other data structures. For example, the methods disclosed in the current application can be used for tree-like data structures that employ both left-to-right and right-to-leaf sibling pointers, that employ parent pointers in addition to child pointers, and for other such variants and implementations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An indexing system comprising:
one or more processors;
one or more electronic memories to provide random access memory;
one or more mass storage devices to provide persistent data storage; and
one or more indexing routines to, when executed by the one or more processors:
create and manage an index data structure comprising nodes that include key-value/reference pairs, the index data structure including, in the one or more electronic memories, a plurality of the index data structure nodes and, for each of one or more of the plurality of the index data structure nodes, a respective additional reference to a respective other component of the index data structure stored in the one or more electronic memories;
transfer the plurality of the index data structure nodes from the one or more electronic memories to the one or more mass-storage devices; and
remove, from the index data structure, the one or more respective additional references when transferring the plurality of index data structure nodes.

2. The indexing system of claim 1 wherein, the one or more indexing routines, when executed by the one or more processors, are further to:
transfer the plurality of the data structure nodes from the one or more mass-storage devices to the one or more electronic memories; and
insert the one or more respective additional references for the one or more of the plurality of the index data structure nodes into a portion of the index data structure stored in the one or more electronic memories.

3. The indexing system of claim 2 wherein the one or more indexing routines, when executed by the one or more processors, are further to:
when transferring the plurality of the index data structure nodes from the one or more mass storage devices to the one or more electronic memories, link the plurality of the index data structure nodes to the portion of the index data structure stored in the one or more electronic memories through references of key-value/reference pairs within one or more of the index data structure plurality of the index data structure nodes and other of the index data structure nodes already linked to the portion of the index data structure.

4. The indexing system of claim 2 wherein, the one or more indexing routines, when executed by the one or more processors, are further to:
recursively traverse the portion of the index data structure stored in the one or more electronic memories to insert the one or more additional references into the plurality of the index data structure nodes transferred from the one or more mass storage devices to the one or more electronic memories.

5. The indexing system of claim 1 wherein the one or more indexing routines, when executed by the one or more processors, are further to:
store a portion of the index data structure in the one or more electronic memories as the plurality of index data structure nodes and a set of index data structure node descriptors stored in a different portion of the one or more electronic memories than the plurality of index data structure nodes,
wherein each of the respective other components of the index data structure stored in the one or more electronic memories includes one of the index data structure node descriptors.

6. The indexing system of claim 5
wherein the index data structure is a tree-structured data structure;
wherein each of the index data structure node descriptors stores a reference to one of the index data structure nodes and one or more of a right-to-left sibling reference of the tree-structured data structure, a left-to-right sibling reference of the tree-structured data structure, and a parent reference of the tree-structured data structure; and
wherein each of the respective additional references is one of the sibling or parent references.

7. The indexing system of claim 1 wherein the one or more indexing routines, when executed by the one or more processors, are further to:
reorganize the index data structure nodes stored within the one or more mass-storage devices without the one or more respective additional references,
wherein the one or more mass-storage devices include at least one magnetic disk, and
wherein each of the respective other components of the index data structure stored in the one or more electronic memories includes one of the index data structure nodes stored in the one or more electronic memories.

8. A method for storing information on a computer system having one or more processors, one or more electronic memories to provide random access memory, and one or more mass-storage devices to provide persistent data storage, and one or more indexing routines executed by the one or more processors, the method comprising:
creating an index data structure comprising nodes that include key-value/reference pairs;
storing, with the one or more processors, a given portion of the index data structure in the one or more electronic memories, the given portion including a first plurality of the index data structure nodes and, for each of one or more of the first plurality of index data structure nodes, a respective additional reference to one of the plurality of index data structure nodes stored in the one or more electronic memories; and
transferring the given portion of the index data structure to the one or more mass-storage devices, excluding the one or more respective additional references.

9. The method of claim 8 wherein the storing comprises:
storing the given portion of the index data structure in the one or more electronic memories as the first plurality of the index data structure nodes and a separate set of index data structure node descriptors.

10. The method of claim 9 wherein the storing the given portion in the one or more electronic memories as the first plurality of the index data structure nodes and the separate set of index data structure node descriptors comprises: further:
storing, in each of the index data structure node descriptors, a reference to one of the first plurality of the index data structure nodes stored in the one or more electronic memories and one of the one or more respective additional references; and
storing one or more key-value/reference pairs in each of the first plurality of the index data structure nodes.

11. The method of claim 10 further comprising:
transferring a second plurality of the index data structure nodes from the one or more mass-storage devices to the one or more electronic memories; and
after transferring the second plurality of the index data structure nodes, inserting, into the one or more electronic memories for the second plurality of the index data structure nodes, one or more other references to one or more of the index data structure nodes stored within the one or more electronic memories.

12. The method of claim 11 further comprising:
linking the second plurality of the index data structure nodes, transferred from the one or more mass storage devices to the one or more electronic memories, to a particular portion of the index data structure stored in the one or more electronic memories through references of key-value/reference pairs within one or more of the index data structure nodes of the second plurality and a third plurality of the index data structure nodes already linked to the particular portion of the index data structure; and
the inserting comprising recursively traversing the particular portion of the index data structure to insert the one or more other references into the index data structure nodes of the second plurality,
wherein the first and second pluralities of the index data structure nodes include the same index data structure nodes.

13. The method of claim 8, wherein the index data structure is a tree-structured data structure, and the one or more additional references comprise one or more sibling references of the tree-structured data structure, the method further comprising:
reorganizing the first plurality of the index data structure nodes persistently stored within the one or more mass-storage devices without the one or more sibling references.

14. A non-transitory computer readable storage medium encoded with instructions executable by a processor of a computing device to implement an index data structure, the storage medium comprising instructions to:
store, in one or more electronic memories of the computing device, a plurality of index data structure nodes each containing one or more key-value/reference pairs;
store, in the one or more electronic memories for one or more of the index data structure nodes, each associated sibling reference to another one of the index data structure nodes stored in the one or more electronic memories; and
transfer the plurality of index data structure nodes to one or more mass-storage devices of the computing device without storing any of the one or more sibling references in the one or more mass-storage devices.

15. The storage medium of claim 14 wherein the instructions to store further comprise instructions to:
store a set of index data structure node descriptors in the one or more electronic memories.

16. The storage medium of claim 15
wherein each of the index data structure node descriptors stores a reference to a respective one of the index data structure nodes stored in the one or more electronic memories and the sibling reference associated with the respective one of the index data structure nodes;

wherein the index data structure is a tree-structured data structure including the index data structure nodes in hierarchical levels; and wherein at least one of the sibling references, associated with a given one of the index data structure nodes, is a reference to another one of the index data structures in the same hierarchical level of tree-structured data structure as the given index data structure node.

17. The storage medium of claim 14 wherein the one or more sibling references enable the plurality of index data structure nodes stored in the one or more electronic memories to be concurrently accessed for reading by two or more threads or processes running within one or more computer systems without locking one or more of the plurality of index data structure nodes by the one or more threads or processes.

18. The medium of claim 16 further comprising instructions to reorganize the plurality of index data structure nodes transferred to the one or more mass-storage devices without reading, altering, or writing any sibling references.

19. The storage medium of claim 14 wherein, for each of the key-value/reference pairs, a reference of of the key-value/reference pair references stored data associated with the key value of the key-value/reference pair.

20. The storage medium of claim 14 wherein the instructions to transfer comprise instructions to transfer index data structure nodes of the plurality between the one or more electronic memories and the one or more mass-storage devices so that the index data structure nodes of the plurality that are likely to be accessed within a subsequent period of time are stored in the one or more electronic memories.

* * * * *

UNITED STATES PATENT AND TRADEMARK OFFICE
CERTIFICATE OF CORRECTION

PATENT NO.         : 8,375,012 B1                                    Page 1 of 1
APPLICATION NO.    : 13/206759
DATED              : February 12, 2013
INVENTOR(S)        : Goetz Graefe It is certified that error appears in the above-identified patent and that said Letters Patent is hereby corrected as shown below:

In the Claims:

In column 10, line 39, in Claim 2, before "data" insert -- index --.

In column 10, line 55, in Claim 3, after "the" delete "index data structure".

In column 11, lines 41-43, in Claim 8, after "storage," delete "and one or more indexing routines executed by the one or more processors,".

In column 11, line 65, in Claim 10, after "comprises:" delete "further:".

In column 12, line 52, in Claim 14, after "nodes," delete "each" and insert -- an --, therefor.

In column 14, line 1, in Claim 18, after "The" insert -- storage --.

In column 14, line 6, in Claim 19, after "a reference" delete "of of" and insert -- of --, therefor.

Signed and Sealed this
Sixteenth Day of July, 2013

Teresa Stanek Rea
*Acting Director of the United States Patent and Trademark Office*